US010756904B1

(12) United States Patent
Perlman et al.

(10) Patent No.: US 10,756,904 B1
(45) Date of Patent: Aug. 25, 2020

(54) EFFICIENT AND SECURE DISTRIBUTED LEDGER MAINTENANCE (71) Applicant: EMC IP Holding Company LLC, Hopkinton, MA (US)

(72) Inventors: Radia J. Perlman, Redmond, WA (US); Charles Kaufman, Redmond, WA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 288 days.

(21) Appl. No.: 15/902,538

(22) Filed: Feb. 22, 2018

(51) Int. Cl.
*H04L 9/32* (2006.01)
*H04L 9/06* (2006.01)
*G06F 16/23* (2019.01)
*G06F 16/27* (2019.01)

(52) U.S. Cl.
CPC ............ *H04L 9/3247* (2013.01); *G06F 16/23* (2019.01); *G06F 16/27* (2019.01); *H04L 9/0637* (2013.01)

(58) Field of Classification Search
CPC ..... H04L 9/3247; H04L 9/0637; G06F 16/27; G06F 16/23
See application file for complete search history.

(56) References Cited

U.S. PATENT DOCUMENTS 10,158,480 B1 * 12/2018 Winklevoss .......... H04L 9/3239
10,200,197 B1 * 2/2019 Li ......................... H04L 9/3239
10,419,209 B1 * 9/2019 Griffin ................... H04L 9/0643
2009/0006853 A1 * 1/2009 Li ......................... H04L 63/0428 713/176
2010/0146287 A1 * 6/2010 Kreiner ................... H04L 63/12 713/178
2016/0259813 A1 * 9/2016 Krupakaran .......... G06F 16/178
2017/0124556 A1 5/2017 Seger, II
2017/0228731 A1 8/2017 Sheng et al.
2017/0236123 A1 * 8/2017 Ali ...................... G06Q 20/3825 705/75
2017/0243286 A1 * 8/2017 Castinado .............. G06Q 40/00
2017/0279783 A1 * 9/2017 Milazzo ................ H04L 63/061
2017/0323392 A1 * 11/2017 Kasper ................... G06Q 40/12
2017/0346693 A1 11/2017 Dix et al.
2018/0101842 A1 * 4/2018 Ventura ................. G06F 3/0619
2018/0115538 A1 * 4/2018 Blake ........................ H04L 9/14

(Continued)

*Primary Examiner* — Aravind K Moorthy
(74) *Attorney, Agent, or Firm* — Ryan, Mason & Lewis, LLP (57) ABSTRACT

An apparatus in one embodiment includes at least one processing device comprising a processor coupled to a memory. The processing device is configured to implement a first ledger maintenance node. The first ledger maintenance node is configured to communicate over one or more networks with a plurality of additional ledger maintenance nodes, to identify a block for proposed addition to a distributed ledger collectively maintained by the first and additional ledger maintenance nodes, to apply a digital signature of the first ledger maintenance node to the block, and to receive digital signatures on the block from at least a subset of the additional ledger maintenance nodes. Responsive to receipt of sufficient digital signatures from respective ones of the additional ledger maintenance nodes to meet a specified quorum of digital signatures required for addition of the block to the distributed ledger, the first ledger maintenance node adds the block to the distributed ledger.

20 Claims, 4 Drawing Sheets

(56) References Cited

U.S. PATENT DOCUMENTS

| | | | |
|---|---|---|---|
| 2018/0145836 A1* | 5/2018 | Saur | G06Q 20/3829 |
| 2018/0225611 A1* | 8/2018 | Daniel | G06Q 20/065 |
| 2018/0247320 A1* | 8/2018 | Gauld | G06Q 30/0201 |
| 2018/0374283 A1* | 12/2018 | Pickover | G07C 5/085 |
| 2019/0004789 A1* | 1/2019 | Mills | H04L 63/12 |
| 2019/0036778 A1* | 1/2019 | Bathen | H04L 43/0876 |
| 2019/0065709 A1* | 2/2019 | Salomon | H04L 9/3239 |
| 2019/0130190 A1* | 5/2019 | Raspotnik, Jr. | G06F 21/16 |
| 2019/0139047 A1* | 5/2019 | Ronnow | H04L 63/10 |
| 2019/0172021 A1* | 6/2019 | Watson | H04L 67/18 |
| 2019/0173666 A1* | 6/2019 | Ardashev | H04L 9/3239 |
| 2019/0179939 A1* | 6/2019 | Govindarajan | G06F 16/2445 |
| 2019/0188704 A1* | 6/2019 | Grendon | G06Q 20/38215 |
| 2019/0190696 A1* | 6/2019 | Singh | H04L 9/0637 |
| 2019/0207749 A1* | 7/2019 | McKellar | G06F 21/64 |
| 2019/0238486 A1* | 8/2019 | Zizka | H04L 9/0637 |
| 2019/0238525 A1* | 8/2019 | Padmanabhan | G06F 21/6245 |
| 2019/0289019 A1* | 9/2019 | Thekadath | G06Q 20/3829 |
| 2019/0340361 A1* | 11/2019 | Daniel | G06F 21/51 |
| 2019/0347444 A1* | 11/2019 | Lowagie | H04L 9/3073 |
| 2020/0007316 A1* | 1/2020 | Krishnamacharya | H04L 63/0421 |
| 2020/0021446 A1* | 1/2020 | Roennow | H04L 63/0478 |

\* cited by examiner

EFFICIENT AND SECURE DISTRIBUTED LEDGER MAINTENANCE

FIELD

The field relates generally to information security, and more particularly to techniques for maintaining a blockchain or other type of distributed ledger.

BACKGROUND

Many conventional distributed ledgers, such as the blockchain used to support the Bitcoin cryptocurrency, are protected against attack by utilizing a large number of unknown "miners" to generate proof-of-work integrity checks. In such arrangements, the integrity check typically comprises a chain of hashes of all of the blocks of the distributed ledger. The integrity checks are therefore designed to be computationally very expensive to compute but very easy to verify. Moreover, there is generally no secret information utilized in computing the hashes of the blocks. This could lead to serious security problems if, for example, an attacker were able to aggregate more computational resources than the blockchain miner community. These and other issues also render conventional arrangements inappropriate for private blockchain implementations in which there are a relatively small number of known participants.

SUMMARY

Illustrative embodiments of the invention provide efficient and secure distributed ledger maintenance by cooperative interaction of a plurality of ledger maintenance nodes to obtain a quorum of digital signatures for a given block before that block is added to the distributed ledger. Such arrangements can provide significant advantages in maintenance of blockchains and other types of distributed ledgers in a wide variety of different contexts. For example, some embodiments allow multiple semi-trusted known processing entities to collectively maintain a distributed ledger, where a subset of those processing entities can become malicious and still not be able to disrupt the integrity of the distributed ledger. Integrity checking is considerably facilitated in these illustrative embodiments, as the entire distributed ledger need not be examined in order to verify integrity checks. These embodiments not only compute integrity checks in a far more efficient way than the above-described conventional arrangements, but are also substantially more secure than those conventional arrangements. Such illustrative embodiments are therefore particularly well-suited for use with private blockchain implementations, as well as in numerous other distributed ledger contexts.

In one embodiment, an apparatus includes at least one processing device comprising a processor coupled to a memory. The processing device is configured to implement a first ledger maintenance node. The first ledger maintenance node is configured to communicate over one or more networks with a plurality of additional ledger maintenance nodes, to identify a block for proposed addition to a distributed ledger collectively maintained by the first and additional ledger maintenance nodes, to apply a digital signature of the first ledger maintenance node to the block, and to receive digital signatures on the block from at least a subset of the additional ledger maintenance nodes. Responsive to receipt of sufficient digital signatures from respective ones of the additional ledger maintenance nodes to meet a specified quorum of digital signatures required for addition of the block to the distributed ledger, the first ledger maintenance node adds the block to the distributed ledger.

The block identified for proposed addition to the distributed ledger may be a block that is generated by the first ledger maintenance node. Alternatively, the block identified for proposed addition may be selected from one or more blocks proposed for addition by respective ones of the additional ledger maintenance nodes. Therefore, in some embodiments, identifying the block for proposed addition to the distributed ledger comprises abandoning a previously-proposed block generated in the first ledger maintenance node in favor of another block proposed for addition by one of the additional ledger maintenance nodes.

In some embodiments, there are N ledger maintenance nodes and the specified quorum of digital signatures requires digital signatures of at least K of the N ledger maintenance nodes including the first ledger maintenance node, where K<N. More particularly, in these embodiments, it is also preferable that K>N/2.

As noted above, it is an advantage of certain illustrative embodiments that the entire distributed ledger need not be continuously maintained in order to permit integrity proofs to be generated. For example, an integrity proof for a given block of the distributed ledger can be generated by verifying that a quorum of digital signatures exists for the given block, and then verifying that each of the digital signatures in the quorum is correct. As another example, an integrity proof for a given block of the distributed ledger can be generated by checking that correct hashes based at least in part on the given block are included in respective ones of a plurality of subsequent blocks, and verifying that a quorum of digital signatures exists for a final one of the subsequent blocks.

Accordingly, in such embodiments, the distributed ledger may be periodically truncated by deleting one or more blocks from the distributed ledger that were added to the distributed ledger prior to a designated point in time.

In some embodiments, different blocks may be proposed for addition to the distributed ledger within a given time period by different ones of the ledger maintenance nodes. In one example of such an arrangement, responsive to a block proposed by the first ledger maintenance node receiving the specified quorum of digital signatures and at least one other block proposed by another one of the ledger maintenance nodes also receiving the specified quorum of digital signatures, a tie-breaking algorithm is executed to select a particular one of the proposed blocks to add to the distributed ledger.

Leader election may be used in some embodiments to control which of the ledger maintenance nodes is permitted to propose the addition of blocks to the distributed ledger at any given time. In such an arrangement, only the ledger maintenance node that currently holds the leader designation may be permitted to propose blocks for addition to the distributed ledger. For example, the first ledger maintenance node may be designated as a leader of the ledger maintenance nodes based at least in part on a leader election carried out by the first and additional ledger maintenance nodes. The leader election may be repeated responsive to a failure of the first ledger maintenance node to achieve the specified quorum of digital signatures for the proposed block.

These and other illustrative embodiments include, without limitation, systems, apparatus, methods and computer program products comprising processor-readable storage media.

DETAILED DESCRIPTION

Illustrative embodiments of the present invention will be described herein with reference to exemplary information processing systems and associated processing devices. It is to be appreciated, however, that embodiments of the invention are not restricted to use with the particular illustrative system and device configurations shown. Accordingly, the term "information processing system" as used herein is intended to be broadly construed, so as to encompass, for example, a wide variety of different processing platforms including cloud-based processing platforms that include combinations of virtual and physical compute, network and storage resources.

Figure 1:
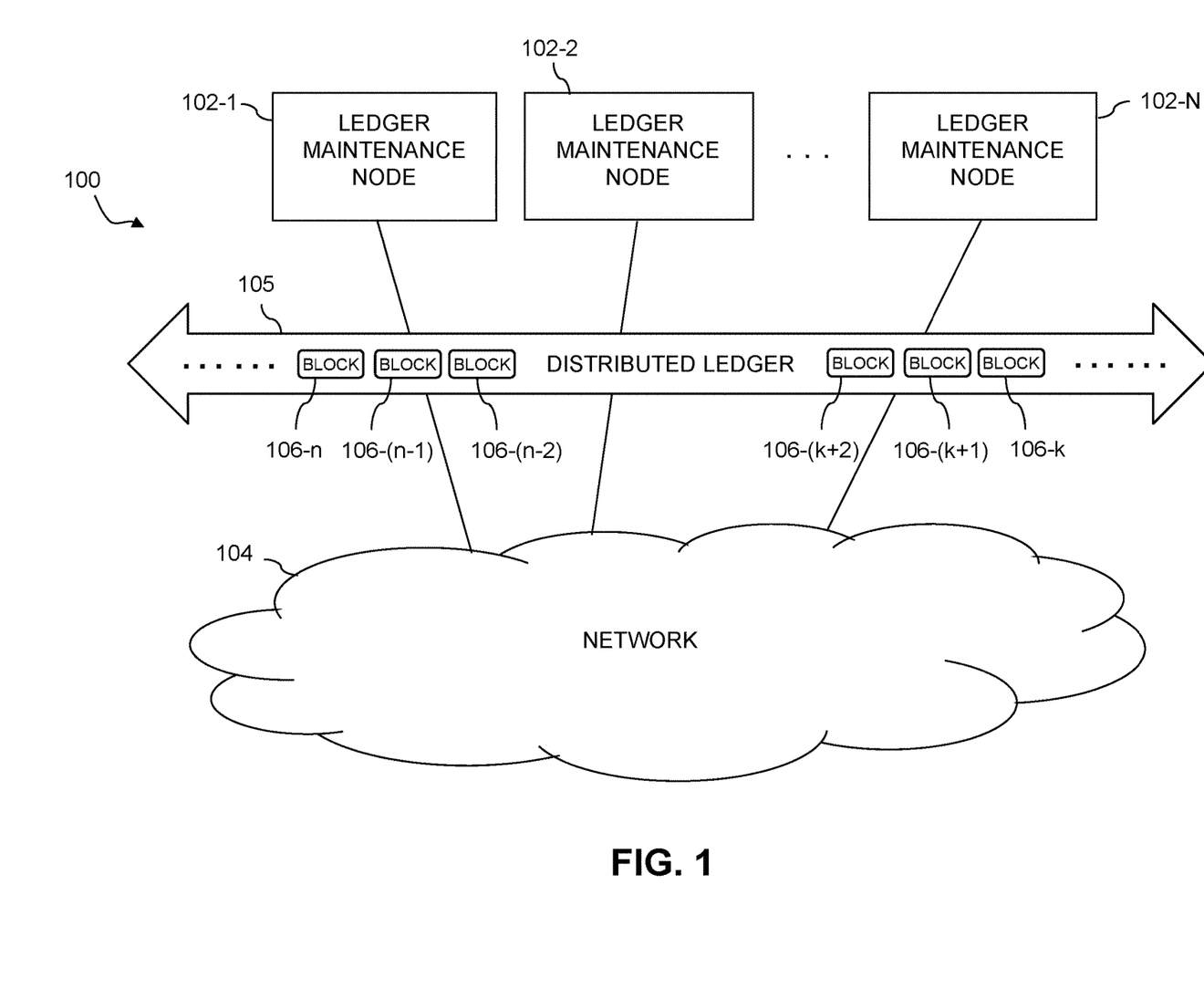
FIG. 1 is a block diagram of an information processing system comprising a plurality of ledger maintenance nodes configured to implement functionality for efficient and secure distributed ledger maintenance in an illustrative embodiment.

FIG. 1 shows an information processing system 100 configured in accordance with an illustrative embodiment of the invention. The information processing system 100 comprises a plurality of ledger maintenance nodes 102-1, 102-2, . . . 102-N, collectively referred to herein as ledger maintenance nodes 102. The ledger maintenance nodes 102 are configured to communicate with one another over a network 104.

The ledger maintenance nodes 102 may comprise, for example, respective servers or other types of computers. Such devices are examples of what are more generally referred to herein as "processing devices." It is also possible that one or more of the ledger maintenance nodes 102 may be implemented at least in part using respective processing devices comprising cloud-based virtualization infrastructure such as virtual machines or containers.

The network 104 is assumed to comprise a portion of a global computer network such as the Internet, although other types of networks can be part of the information processing system 100, including a wide area network (WAN), a local area network (LAN), a satellite network, a telephone or cable network, a cellular network, a wireless network such as a WiFi or WiMAX network, or various portions or combinations of these and other types of networks. The information processing system 100 in some embodiments therefore comprises combinations of multiple different types of networks each comprising processing devices configured to communicate using IP or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The ledger maintenance nodes 102 in this embodiment are configured to collectively maintain a distributed ledger 105. The distributed ledger 105 includes a plurality of blocks 106 each of which is added to the distributed ledger 105 based on achievement of a specified quorum of digital signatures on that block from respective ones of the ledger maintenance nodes 102. The blocks 106 of the distributed ledger 105 as shown illustratively include a current block denoted 106-$n$ and a plurality of previous blocks denoted 106-(n-1), 106-(n-2) . . . 106-(k+2), 106-(k+1), 106-$k$, respectively.

The distributed ledger 105 is collectively maintained by the ledger maintenance nodes 102 on a peer-to-peer basis without utilizing a centralized authority.

For example, in some embodiments, each of the ledger maintenance nodes 102 adds the same proposed block to the distributed ledger 105 in each of a plurality of rounds of a consensus protocol that requires the specified quorum of digital signatures for addition of the block to the distributed ledger 105.

Information regarding proposed blocks may be distributed between the ledger maintenance nodes 102 using well-known conventional link state routing protocol flooding algorithms. A given such algorithm is advantageously configured to ensure that all of the ledger maintenance nodes 102 receive the most recent copies of proposed block information distributed among those nodes. Other types of proposed block distribution techniques may be used in other embodiments.

As shown in the figure, there are N ledger maintenance nodes 102 in the system 100. The specified quorum of digital signatures for adding a proposed block to the distributed ledger 105 illustratively requires digital signatures of at least K of the N ledger maintenance nodes 102, where K<N. Such an arrangement ensures that the distributed ledger 105 is robust against even Byzantine failures of up to K-1 of the ledger maintenance nodes 102.

More particularly, it is desirable in some embodiments to configure the digital signature quorum variable K such that K>N/2. This guarantees that in the case of a partitioning of the ledger maintenance nodes 102, at most one of the resulting partitions will continue to generate blocks on the distributed ledger 105. For example, it is possible for two different proposed blocks to each achieve a quorum of signatures, if the requisite number of ledger maintenance nodes 102 see the better block after they have already signed a different block. Setting K>N/2 ensures that there will not be forks of arbitrary length, which might otherwise occur if two different partitions each added its own blocks to the distributed ledger 105 without seeing the blocks of the other partition.

Each of the ledger maintenance nodes 102 in the FIG. 1 embodiment is assumed to be implemented using at least one processing device. Each such processing device generally comprises at least one processor and an associated memory, and implements one or more functional modules for controlling certain features of the corresponding one of the ledger maintenance nodes 102.

It should be noted that the distributed ledger 105 is illustratively shown in FIG. 1 as an abstraction that is separate from the ledger maintenance nodes 102 and the network 104. The distributed ledger 105 is more particularly maintained by the ledger maintenance nodes 102 as respective local copies 105-1, 105-2, . . . 105-N that are stored by the respective ledger maintenance nodes 102. Through the above-noted consensus protocol, the ledger maintenance nodes 102 interact with one another in an attempt to reach agreement regarding a current version of the distributed ledger 105.

Each of the ledger maintenance nodes 102 illustratively makes its local copy of the distributed ledger 105 accessible to authorized entities, such as other ones of the ledger maintenance nodes 102, that request information regarding that local copy. The single distributed ledger 105 represents the common value of all of the individual local copies, with the consensus protocol operating to ensure that all properly-functioning nodes 102 will compute the same value for the distributed ledger 105. The local copies stored by respective ones of the ledger maintenance nodes 102 may differ in a certain number of their most recent blocks (e.g., the most recent two blocks) that are still subject to negotiation and potential replacement in accordance with the consensus protocol, but the consensus protocol is configured to ensure that all of the local copies otherwise agree.

For example, in some embodiments, the consensus protocol is configured such that each of the ledger maintenance nodes 102 only signs the "best" block that it has seen so far for a particular position in the distributed ledger 105, based on certain designated criteria such as length of the hash of the block. If a given one of the ledger maintenance nodes 102 has previously signed a "worse" block, and then sees a "better" block, it abandons the "worse" block and signs and stores in its local copy the "better" block for that position in the distributed ledger 105. If only the "best" block receives the specified quorum of digital signatures, that block is made part of the distributed ledger 105.

However, it is possible that more than two blocks may each receive the specified quorum of digital signatures. Assuming two such blocks B1 and B2 for position n each receive the specified quorum of digital signatures, some of the ledger maintenance nodes 102 may attempt to build a block for position n+1 using B1, while other ones of the ledger maintenance nodes 102 attempt to build a block for position n+1 using B2. To prevent such forks, the consensus protocol may be configured such that if a given node is aware of B1, where B1 is better than B2, and the given node sees a block n+1 built on B2, it does not sign that block n+1, hoping that B1 will be adopted by more nodes and become the definitive block for position n in the distributed ledger 105. If the block n+1 built on B2 winds up with a quorum, despite the given node refusing to sign that block, and the block is valid in all other requisite respects, then the given node will abandon block B1 and block B2 will be stored as block n in the distributed ledger 105. Any tie-breakers that may need to be performed to decide on a particular block n+1 are illustratively based solely on block n+1, and not on the previous block n upon which block n+1 is built, assuming all blocks are valid in all requisite respects. Other types of consensus protocol configurations can be used in other embodiments.

Figure 2:
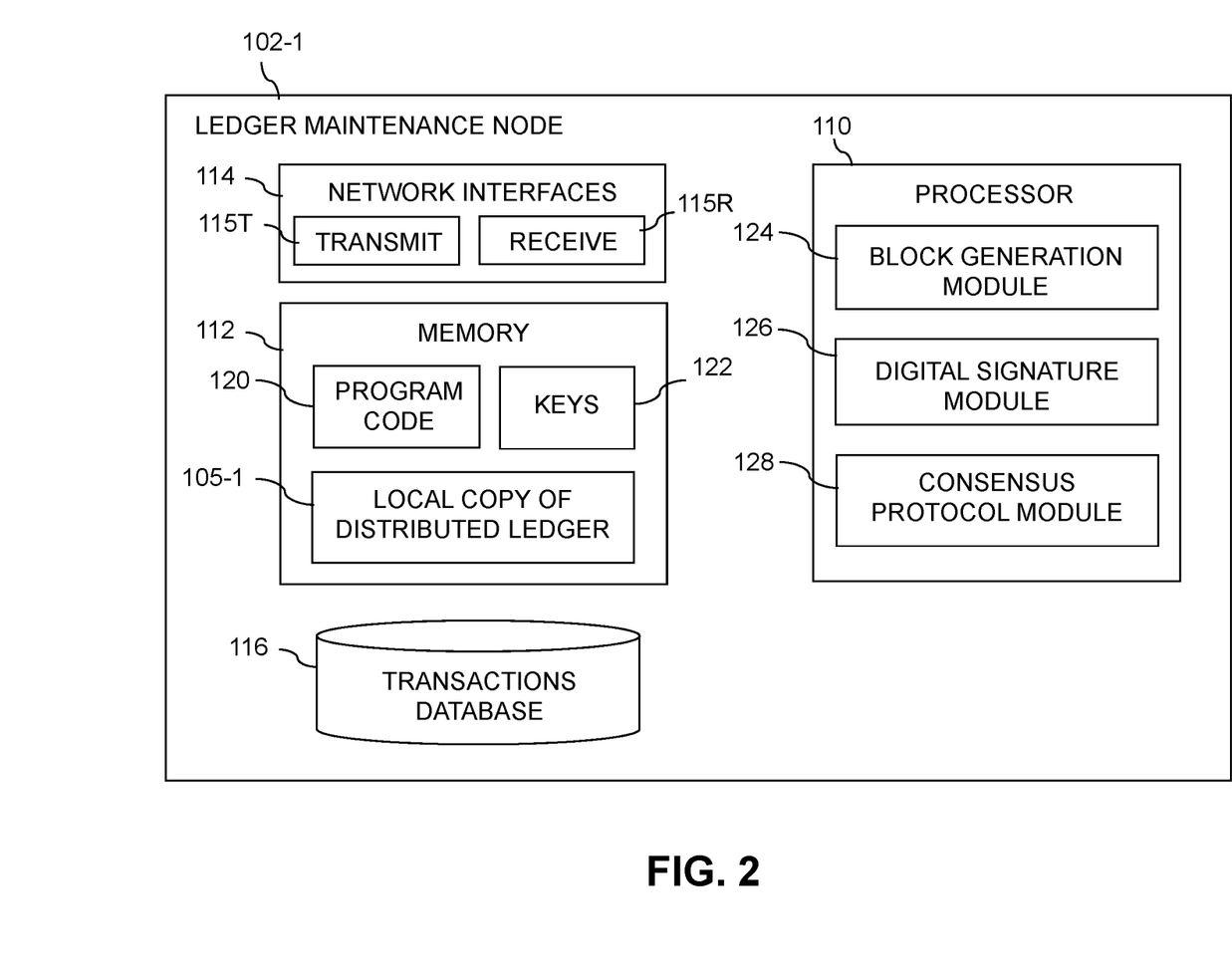
FIG. 2 shows a more detailed view of a particular one of the ledger maintenance nodes of the FIG. 1 system in an illustrative embodiment.

FIG. 2 shows a more detailed view of a first one of the ledger maintenance nodes 102-1. As indicated above, the ledger maintenance node 102-1 stores a local copy 105-1 of the distributed ledger 105. It is assumed that each of the other ones of the ledger maintenance nodes 102 is also configured in a manner similar to that shown in FIG. 2, and accordingly stores its own local copy of the distributed ledger 105.

The ledger maintenance node 102-1 in this embodiment more particularly comprises a processor 110 that interacts with a memory 112 and with a plurality of network interfaces 114. The processor 110 is assumed to be coupled to the memory 112 and to the network interfaces 114 via one or more signal buses or other interconnection mechanisms not explicitly shown in the figure.

The processor 110 illustratively comprises a microprocessor, a microcontroller, an application-specific integrated circuit (ASIC), a field-programmable gate array (FPGA) or other type of processing circuitry, and may in some cases comprise portions or combinations of such circuitry elements.

The memory 112 illustratively comprises random access memory (RAM), read-only memory (ROM), flash memory or other types of memory, in any combination. The memory 112 and other memories disclosed herein may be viewed as examples of what are more generally referred to as "processor-readable storage media" storing executable computer program code or other types of software programs.

Articles of manufacture comprising such processor-readable storage media are considered embodiments of the present invention. A given such article of manufacture may comprise, for example, a storage device such as a storage disk, a non-volatile memory, a storage array or an integrated circuit containing memory, as well as a wide variety of other types of computer program products. The term "article of manufacture" as used herein should be understood to exclude transitory, propagating signals.

The memory 112 stores the local copy 105-1 of the distributed ledger 105 for ledger maintenance node 102-1.

The network interfaces 114 allow the ledger maintenance node 102-1 to communicate over the network 104 with the other ledger maintenance nodes 102, and illustratively comprise transmit components 115T and receive components 115R of one or more transceivers implemented in the ledger maintenance node 102-1.

The ledger maintenance node 102-1 further comprises a transactions database 116. The transactions database 116 stores transactions that are to be included in one or more blocks 106 that are proposed for addition to the distributed ledger 105 by the ledger maintenance node 102-1 or other ones of the ledger maintenance nodes 102. An example of one of the blocks 106 having transactions and other information elements contained therein will be described in more detail below in conjunction with FIG. 4.

The transactions database 116 in the present embodiment is illustratively implemented as part of one or more storage systems coupled to or otherwise associated with one or more processing devices that are utilized to implement the ledger maintenance node 102-1.

Such storage systems can comprise any of a variety of different types of storage including by way of example network-attached storage (NAS), storage area networks (SANs), direct-attached storage (DAS) and distributed DAS, as well as combinations of these and other storage types, including but not limited to flash storage, storage arrays, software-defined storage, cloud storage and object-based storage.

Although shown as being arranged internally to the ledger maintenance node 102-1, the transactions database 116 in some embodiments can be at least in part external to the ledger maintenance node 102-1. Also, at least portions of the transactions database 116 can additionally or alternatively be implemented as an in-memory database utilizing the memory 112 of the ledger maintenance node 102-1.

The memory 112 in this embodiment further comprises program code 120 and cryptographic keys 122. The program code 120 illustratively comprises software that is utilized by the processor 110 to implement functionality for efficient and secure distributed ledger maintenance within the ledger maintenance node 102-1. The cryptographic keys 122 more particularly comprise respective private keys for generating digital signatures on blocks 106 to be added to the distributed ledger 105 within the system 100. Each such private key is part of a public-private key pair having a corresponding public key that is accessible to each of the other ledger maintenance nodes 102.

The processor 110 further comprises a block generation module 124, a digital signature module 126 and a consensus protocol module 128. These modules interact with similar modules in the other ledger maintenance nodes 102 to propose blocks for addition to the distributed ledger 105, to reach consensus on which proposed blocks should actually be added to the distributed ledger 105, and to perform other operations associated with collective maintenance of the distributed ledger 105.

The first ledger maintenance node 102-1 is configured to identify a block for proposed addition to the distributed ledger 105 collectively maintained by the ledger maintenance nodes 102. The first ledger maintenance node 102-1 applies its digital signature to the proposed block, and receives digital signatures on the proposed block from at least a subset of the other ledger maintenance nodes 102. Responsive to receipt of sufficient digital signatures from respective ones of the other ledger maintenance nodes 102 to meet a specified quorum of digital signatures required for addition of the block to the distributed ledger 105, the first ledger maintenance node 102-1 adds the proposed block to the distributed ledger 105. This addition of the proposed block to the distributed ledger 105 illustratively refers to storage of that block as part of local copy 105-1 of the distributed ledger 105.

In some cases, the proposed block identified by the first ledger maintenance node 102-1 is generated within that node utilizing its block generation module 124.

For example, the first ledger maintenance node 102-1 can itself generate the block for proposed addition in the first ledger maintenance node. In such an embodiment, the first ledger maintenance node 102-1 accumulates a set of one or more transactions from the transactions database 116, and generates the block in the block generation module 124 based at least in part on the accumulated set. This further includes timestamping the block prior to applying the digital signature to the block.

In other cases, the proposed block identified by the first ledger maintenance node 102-1 is not generated within that node, but is instead generated by another one of the ledger maintenance nodes 102.

For example, the first ledger maintenance node 102-1 may be configured to identify the block for proposed addition from one or more blocks proposed for addition by respective other ones of the ledger maintenance nodes 102. This may illustratively involve the first ledger maintenance node 102-1 abandoning a previously-proposed block generated in the first ledger maintenance node 102-1 in favor of another block proposed for addition by one of the other ledger maintenance nodes 102.

Accordingly, the consensus protocol implemented by consensus protocol module 128 of the first ledger maintenance node 102-1 and other similar consensus protocol modules implemented by respective other ones of the ledger maintenance nodes 102 is illustratively configured such that different ones of the nodes can propose different blocks for addition to the distributed ledger 105 within a given round of the consensus protocol. If multiple such proposed blocks each receives a quorum of digital signatures, a tie-breaking algorithm of the type described elsewhere herein is used to select a particular one of those approved blocks for addition to the distributed ledger 105 in the current round.

The consensus protocol may include a mechanism for each of the ledger maintenance nodes 102 to rate multiple proposed blocks and to decide which is preferred. For example, a given one of the ledger maintenance nodes 102 may be configured to start by proposing the block that it generated, and if it detects another node proposing a block that is preferable to its own, it stops trying to get its own block signed by a quorum of nodes and instead starts trying to get the preferred block signed by a quorum of nodes. The goal of the consensus protocol in such an arrangement is illustratively to have the specified quorum of nodes agree to add the same block to the distributed ledger 105.

Figure 4:
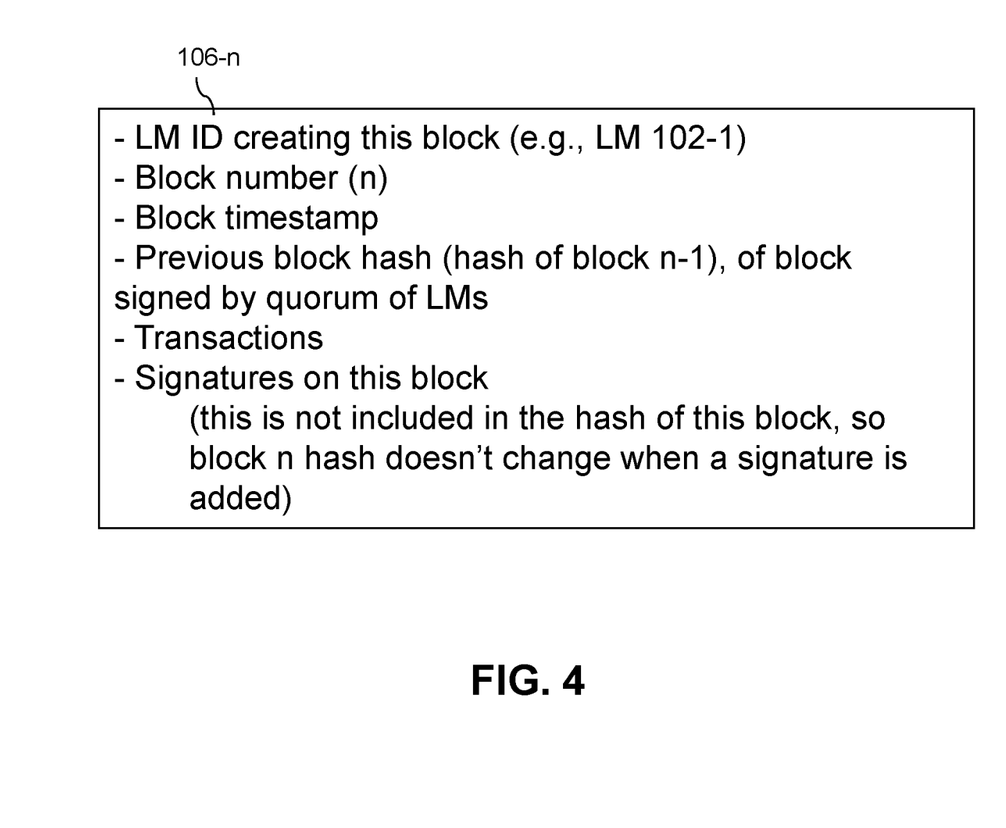
FIG. 4 shows an example of a block added to a distributed ledger by one of the ledger maintenance nodes of the FIG. 1 system.

An instance of current block 106-*n* that may be generated by the first ledger maintenance node 102-1 or another one of the ledger maintenance nodes 102 may have the example format shown in FIG. 4, although numerous other block formats may be used.

Assuming without limitation that the current block 106-*n* was generated by the first ledger maintenance node 102-1, the block illustratively includes a digital signature of the first ledger maintenance node 102-1 and may further include one or more additional signatures of other ones of the ledger maintenance nodes 102.

The first ledger maintenance node 102-1 applies its digital signature to the block 106-*n* by including the digital signature in the block as illustrated in FIG. 4. Applying a digital signature of the first ledger maintenance node 102-1 to the block more particularly comprises signing the block using a private key of a public-private key pair of the first ledger maintenance node 102-1. The digital signature is illustratively generated by the digital signature module 126. Any of a wide variety of different digital signature protocols known to those skilled in the art may be implemented in the digital signature module 126. Examples of such digital signature protocols are disclosed in A. J. Menezes et al., "Handbook of Applied Cryptography," CRC Press, 1997, which is incorporated by reference herein.

The other ledger maintenance nodes 102 can similarly add their respective digital signatures to the block. More particularly, digital signatures from respective other ones of the ledger maintenance nodes 102 are generated using respective private keys of public-private key pairs of those other ledger maintenance nodes 102. The block is illustratively updated to include the digital signatures of any of the ledger maintenance nodes 102 that approve the addition of that block to the distributed ledger 105.

A proposed block that meets the specified quorum of digital signatures will illustratively include the digital signatures of at least K of the N ledger maintenance nodes 102, including the digital signature of the particular ledger maintenance node that originally generated that particular proposed block.

The ledger maintenance nodes 102 in the present embodiment therefore collectively maintain the distributed ledger 105 by ensuring that a quorum of digital signatures is received for a given block before that block is added to the distributed ledger. This functionality is illustratively implemented through cooperative interaction of consensus protocol module 128 of first ledger maintenance node 102-1 with similar consensus protocol modules of respective other ones of the ledger maintenance nodes 102. Such arrangements can provide significant advantages in maintenance of blockchains and other types of distributed ledgers in a wide variety of different contexts.

For example, the ledger maintenance nodes 102 in some embodiments comprise respective semi-trusted known processing entities. Requiring the quorum of digital signatures on a given proposed block before that block can be added to the distributed ledger 105 ensures that a subset of those known processing entities can become malicious and still not be able to disrupt the integrity of the distributed ledger 105.

Integrity checking is also facilitated in the system 100, in that the entire distributed ledger 105 need not be examined in order to verify integrity checks. In some embodiments, integrity checking involves generating one or more integrity proofs, although other types of integrity checks can be performed.

For example, an integrity proof for a given block of the distributed ledger 105 may be generated by verifying that a quorum of digital signatures exists for the given block, and verifying that each of the digital signatures in the quorum is correct.

As another example, an integrity proof for a given block of the distributed ledger 105 may be generated by checking that correct hashes based at least in part on the given block are included in respective ones of a plurality of subsequent blocks, and verifying that a quorum of digital signatures exists for a final one of the subsequent blocks.

Integrity proofs of the type described above are very efficient to compute, but infeasible to forge. This is in contrast to certain conventional public blockchain arrangements, in which integrity proofs are usually equally difficult to compute as to forge. Private blockchain arrangements such as Hyperledger typically do not provide any such proof of integrity of a distributed ledger.

In illustrative embodiments, each block 106 is "sealed" with a quorum of digital signatures. Such an arrangement ensures that it is not only the ledger maintenance nodes 102 that can verify the integrity of the distributed ledger 105. Instead, non-participants in the ledger maintenance process can also verify that a quorum of signatures exists for a given block. This advantageously allows for the truncation of the ledger. Also, such outside parties can verify that consensus was reached rather than having to trust any particular one of the ledger maintenance nodes 102 on that point.

As it is not necessary to keep the distributed ledger 105 in its entirety in order to be able to prove its authenticity, the system 100 could be configured, for example, to keep just the last month or least year of the distributed ledger 105.

Accordingly, the distributed ledger 105 may be periodically truncated by deleting one or more blocks from the distributed ledger 105 that were added to the distributed ledger 105 prior to a designated point in time. For example, all blocks added prior in time to block 106-$k$ may be deleted from the distributed ledger 105, without in any way interfering with the ability to perform integrity checks based on remaining blocks.

Illustrative embodiments not only compute integrity checks in a far more efficient way than conventional arrangements, but are also substantially more secure than those conventional arrangements. For example, digital signature based integrity checks of the type described above are significantly more secure than proof-of-work integrity checks typically used in public blockchain arrangements.

These embodiments are also illustratively configured such that undesirable forks will not be created in the distributed ledger 105. Instead, the distributed ledger 105 remains immutable as blocks are added thereto, assuming that the specified quorum of the ledger maintenance nodes 102 are honest.

In some embodiments, different blocks may be proposed for addition to the distributed ledger 105 within a given time period by different ones of the ledger maintenance nodes, where the given time period illustratively corresponds to a particular round of the consensus protocol. For example, it is possible in some cases that a block proposed by the first ledger maintenance node 102-1 may receive the specified quorum of digital signatures and at least one other block proposed by another one of the ledger maintenance nodes 102 may also receive the specified quorum of digital signatures.

In such cases, the ledger maintenance nodes 102 are configured to execute a tie-breaking algorithm to select a particular one of the proposed blocks to add to the distributed ledger. For example, the tie-breaking algorithm may involve generating hashes of respective ones of the proposed blocks, and selecting a particular one of the proposed blocks to add to the distributed ledger 105 based at least in part on the hashes. As a more particular example, in one such arrangement, the proposed block that results in the smallest hash, and that has been agreed-upon by the specified quorum of ledger maintenance nodes, is accepted as the next block of the distributed ledger 105.

In other embodiments, leader elections may be used to ensure that only one of the ledger maintenance nodes 102 can propose a block within a given time period. For example, the first ledger maintenance node 102-1 may be designated as a leader of the ledger maintenance nodes 102 based at least in part on a leader election carried out by the ledger maintenance nodes 102, such that only the first ledger maintenance node 102-1 is permitted to propose blocks for addition to the distributed ledger while it holds the leader designation. The leader election may be repeated responsive to a failure of the first ledger maintenance node 102-1 to achieve the specified quorum of digital signatures for the proposed block. If a given designated leader is corrupted, the other nodes can refuse to agree to add blocks proposed by that leader, and can thereby force the election of a new leader.

The above-described tie-breaking and/or leader election functionality is also illustratively implemented through cooperative interaction of consensus protocol module 128 of first ledger maintenance node 102-1 with similar consensus protocol modules of respective other ones of the ledger maintenance nodes 102.

As indicated above, aspects of the maintenance of the distributed ledger 105 in the embodiments of FIGS. 1 and 2 are implemented at least in part through cooperative interaction of block generation module 124, digital signature module 126 and consensus protocol module 128 of the processor 110 of the first ledger maintenance node 102-1 with similar modules in each of the ledger maintenance nodes 102.

It is to be appreciated that the particular arrangement of modules 124, 126 and 128 illustrated in the processor 110 of the embodiments of FIGS. 1 and 2 are presented by way of example only, and alternative arrangements can be used in other embodiments. For example, the functionality associated with the modules 124, 126 and 128 in other embodiments can be combined into a single module, or separated across a larger number of modules. As another example, multiple distinct processors can be used to implement different ones of the modules 124, 126 and 128 or portions thereof.

At least portions of the modules 124, 126 and 128 may be implemented at least in part in the form of software comprising program code 120 stored in memory 112 and executed by processor 110.

It should also be understood that the particular set of elements shown in FIGS. 1 and 2 for implementing functionality for efficient and secure distributed ledger maintenance in information processing system 100 is presented by way of illustrative example only, and in other embodiments additional or alternative elements may be used. Thus, another embodiment may include additional or alternative systems, devices and other network entities, as well as different arrangements of modules and other components.

An illustrative embodiment of an example process for efficient and secure distributed ledger maintenance in the information processing system 100 will now be described in more detail with reference to the flow diagram of FIG. 3. The process as illustrated includes steps 300 through 312, all of which are assumed to be performed primarily by a particular one of the ledger maintenance nodes 102, such as ledger maintenance node 102-1, although it is further assumed that similar processes are executed by each of the other ledger maintenance nodes 102 in conjunction with addition of blocks to the distributed ledger 105. It is to be understood that this particular process is only an example, and additional or alternative processes can be carried out in other embodiments.

In step 300, the first ledger maintenance node 102-1 identifies a block for proposed addition to the distributed ledger 105 collectively maintained by the first ledger maintenance node 102-1 and additional ones of the ledger maintenance nodes 102. For example, the block identified for proposed addition may be generated by the first ledger maintenance node 102-1, or may be identified from one or more blocks proposed for addition by respective other ones of the ledger maintenance nodes 102. In the latter case, the first ledger maintenance node 102-1 may abandon a previously-proposed block generated in that node in favor of another block proposed for addition by one of the other ledger maintenance nodes 102. As mentioned previously, conventional link state routing protocol flooding algorithms or other techniques may be used for communicating proposed block information between the ledger maintenance nodes 102.

In step 302, the first ledger maintenance node 102-1 applies its digital signature to the block proposed for addition to the distributed ledger 105. For example, the first ledger maintenance node 102-1 may apply its digital signature to the proposed block by signing the proposed block using a private key of a public-private key pair of the first ledger maintenance node 102-1.

In step 304, the first ledger maintenance node 102-1 receives additional digital signatures on the block from the additional ledger maintenance nodes 102. For example, respective ones of the other ledger maintenance nodes 102 can sign the proposed block using respective private keys of public-private key pairs of those other ledger maintenance nodes 102.

In step 306, a determination is made as to whether or not a specified quorum of digital signatures has been achieved for the proposed block. If the specified quorum of digital signatures is achieved for the proposed block, the process moves to step 308, and otherwise moves to step 310. The specified quorum of digital signatures illustratively comprises digital signatures of at least K of the N ledger maintenance nodes, including the first ledger maintenance node 102-1, where K<N, and more particularly where K>N/2. Other types of quorums can be used in other embodiments.

In step 308, the first ledger maintenance node 102-1 adds the proposed block to the distributed ledger 105, and the process then returns to step 300 via step 312 to identify another block for proposed addition to the distributed ledger 105. This addition of the proposed block to distributed ledger 105 by the first ledger maintenance node 102-1 illustratively involves the first ledger maintenance node 102-1 storing the proposed block as part of its local copy 105-1 of the distributed ledger 105.

In step 310, the proposed block is not added to the distributed ledger 105, and the process then returns directly to step 300 to identify another block for proposed addition to the distributed ledger 105.

In step 312, it is possible that the proposed block added to the distributed ledger 105 in step 308 may be replaced with a different "better" block, possibly one with more signatures and a smaller hash. More particularly, if a better valid block is detected by the first ledger maintenance node 102-1 after adding the previous proposed block to the distributed ledger 105, the first ledger maintenance node 102-1 signs that better valid block and replaces the previous proposed block with the better valid block in the distributed ledger 105. This replacement is with respect to local copy 105-1.

Figure 3:
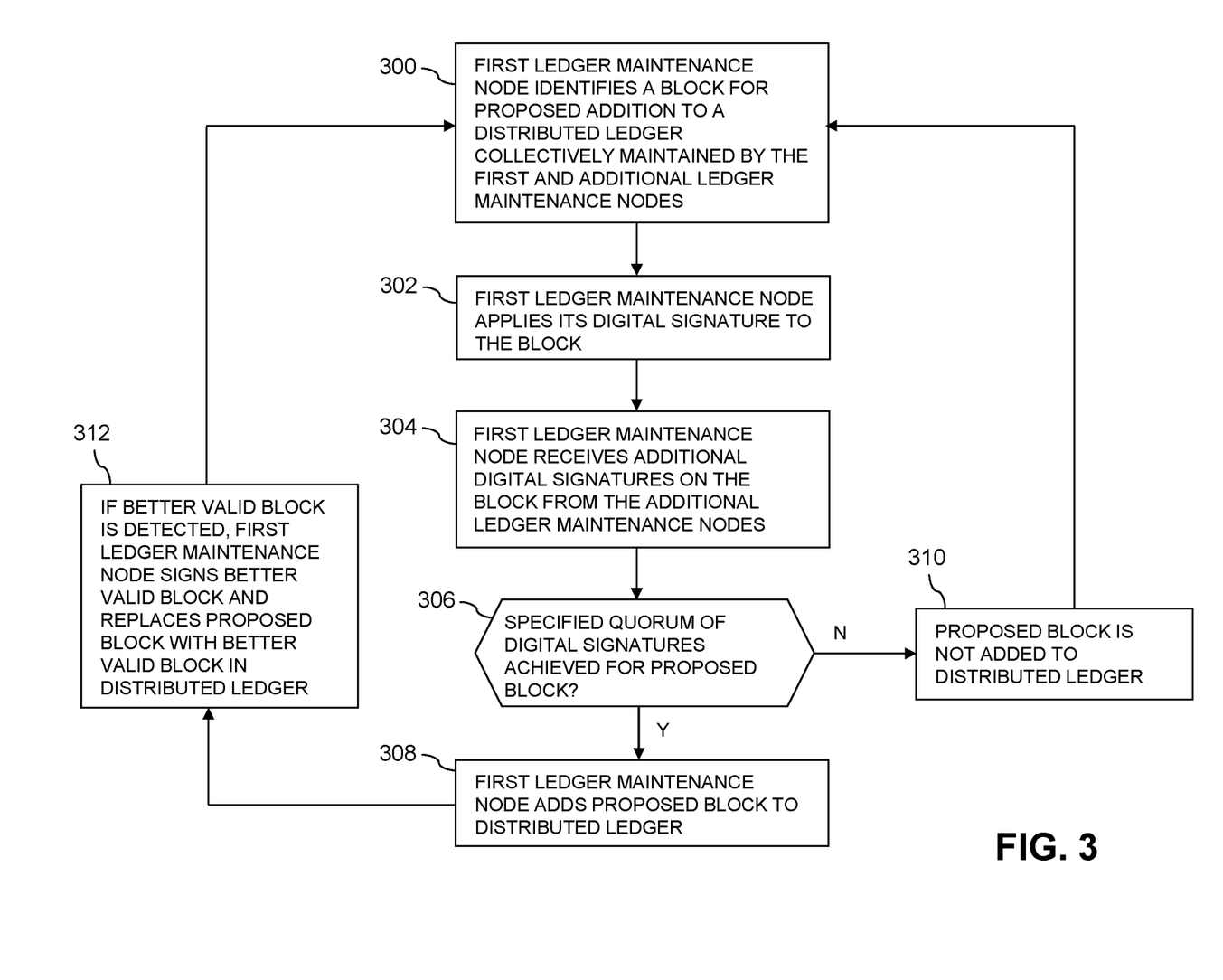
FIG. 3 is a flow diagram of an example process for efficient and secure distributed ledger maintenance carried out by multiple ledger maintenance nodes of the FIG. 1 system in an illustrative embodiment.

The FIG. 3 process is therefore configured to support functionality for each ledger maintenance node 102 to select among multiple proposed blocks within a given round of the consensus protocol.

As another example, the block identified by ledger maintenance node 102-1 in step 300 may comprise a block that was generated by another one of the nodes 102 but that the ledger maintenance node 102-1 recognizes as preferable, based on various designated criteria, to a block that it generated itself. In this case, the node 102-1 in effect detects a "better" block, possibly one with more signatures and a smaller hash, and abandons its own previously-generated block. The node 102-1 therefore signs the new block in step 302, and checks the received signatures for that new block in steps 304 and 306.

It is possible in such arrangements for there to be multiple proposed blocks each achieving the specified quorum of digital signatures, such that a tie-breaking algorithm is needed in order to select a particular one of the proposed blocks to add to the distributed ledger 105. For example, in assembling a block n+1 based on an accepted block n having a quorum of digital signatures, a given one of the ledger maintenance nodes 102 may change its determination of the best block n within the system 100.

Assume by way of illustration that there are multiple instances of a block n proposed for addition to the distributed ledger 105, more particularly denoted as blocks $n_1$ and $n_2$ proposed by respective nodes 102-1 and 102-2, and that block $n_2$ initially wins the tie-breaker, such that node 102-1 begins to assemble a block n+1 for the next round of the consensus protocol based on block $n_2$. If node 102-1 then detects, via flooding communications from the other nodes 102, a different valid block n+1 that is built on node $n_1$, then node 102-1 does not sign that different valid block, but instead re-floods block $n_2$ out to the other nodes 102, hoping that these other nodes will build their proposed n+1 blocks on block $n_2$ instead of block $n_1$. However, if by way of example the different valid block n+1 that was built on block $n_1$ eventually manages to get a quorum of signatures from the nodes 102, node 102-1 will then abandon block $n_2$, and the distributed ledger 105 will have block $n_1$ as its block n.

As indicated previously, FIG. 4 shows an example of current block 106-n added to the distributed ledger 105 based on achievement of the digital signature quorum in accordance with the FIG. 3 process for efficient and secure distributed ledger maintenance. In this embodiment, the current block 106-n includes an identifier ("LM ID") of the particular ledger maintenance node 102, illustratively ledger maintenance node 102-1, that created the block 106-n, a block number ("n") of the block within the distributed ledger 105, a timestamp indicating the time at which the block was created, a hash of previous block 106-(n-1) that was previously added to the distributed ledger 105 based on achievement of the digital signature quorum, a set of transactions, and the signatures on the current block.

In the FIG. 4 embodiment, the signatures on the block 106-n illustratively include at least the digital signature of the particular one of the ledger maintenance nodes 102 that created and originally proposed the block, as well as digital signatures of at least K-1 additional ones of the ledger maintenance nodes 102 that each approved the addition of the block 106-n to the distributed ledger 105. These signatures will not be used in generating the hash of the block 106-n that will be part of the next block 106-(n+1) added to the distributed ledger 105. Such an arrangement ensures that the hash of the block does not change when a digital signature of one of the ledger maintenance nodes is added to the block. However, other block formats can be used in other embodiments.

Another example of a consensus protocol of the FIG. 3 process implemented using a block format of the type shown in FIG. 4 is as follows.

Each of the ledger maintenance nodes 102 attempts to create a block n only after it has seen a quorum of signatures on its stored, best-known, block n-1. There may be some predetermined delay implemented before creating the block n, so as to satisfy some specified minimum elapsed time between blocks within the system 100. If the node subsequently sees a better block n-1, even one that is not quorum-signed, the node accepts and signs that block n-1 in place of its previously-stored block n-1.

In this example, each of the ledger maintenance nodes 102 signs and stores a given block n only if:

1. The node agrees with the included transactions of block n.

2. The node verifies that block n is based on a valid quorum-signed block n-1 previously stored by that node.

3. The node believes that block n is the best block n detected thus far based on designated criteria such as smallest hash.

Assuming that these requirements are met, the node signs and stores the given block n as its current best block n and then circulates information regarding its signed block n using the above-noted flooding communications or other techniques.

The node may later change its determination based on other flooding communications received from other ones of the nodes that may indicate a better block n, possibly based on different block n-1. These and other similar situations can cause the node to alter its stored best blocks n and n-1.

Once the node detects a quorum-signed block n, the node accepts that block n even if the node has a better stored n-1 block than the one on which the quorum-signed block n is based. Until then, the node refuses to sign any other block n based on a worse block n-1, and make sure that all the other nodes are aware of its better block n-1.

Each of the other nodes collectively maintaining the distributed ledger 105 is assumed to operate in a similar manner.

The particular processing operations and other system functionality described above in conjunction with the flow diagram of FIG. 3 are presented by way of illustrative example only, and should not be construed as limiting the scope of the invention in any way. Alternative embodiments can use other types of processing operations to implement efficient and secure distributed ledger maintenance. For example, certain steps may be performed at least in part concurrently with one another rather than serially. As additional examples, one or more of the process steps may be repeated periodically for different blocks proposed for addition to the distributed ledger by one or more of the ledger maintenance nodes 102, and multiple such processing instances can be performed in parallel with one another by different ones of the ledger maintenance nodes 102.

Also, functionality such as that described in conjunction with the flow diagram of FIG. 3 can be implemented at least in part in the form of one or more software programs stored in program code 120 of memory 112 and executed by processor 110. As mentioned previously, a storage device or other memory having executable program code of one or more software programs embodied therein is an example of what is more generally referred to herein as a "processor-readable storage medium."

The foregoing example process is therefore illustrative only, and should not be viewed as limiting the scope of any particular embodiment in any way. Those skilled in the art will appreciate that numerous alternative efficient and secure distributed ledger maintenance arrangements can be used in other embodiments.

Illustrative embodiments provide a number of significant advantages relative to conventional arrangements. For example, one or more such embodiments provide efficient and secure distributed ledger maintenance by cooperative interaction of a plurality of ledger maintenance nodes to obtain a quorum of digital signatures for a given block before that block is added to the distributed ledger.

Such arrangements can provide significant advantages in maintenance of blockchains and other types of distributed ledgers in a wide variety of different contexts. For example, some embodiments allow multiple semi-trusted known processing entities to collectively maintain a distributed ledger, where a subset of those processing entities can become malicious and still not be able to disrupt the integrity of the distributed ledger.

Integrity checking is considerably facilitated in these illustrative embodiments, as the entire distributed ledger need not be examined in order to verify integrity checks. These embodiments not only compute integrity checks in a far more efficient way than the above-described conventional arrangements, but are also substantially more secure than those conventional arrangements.

Such illustrative embodiments are therefore particularly well-suited for use with private blockchain implementations, which typically comprising a relatively small number of known ledger maintenance nodes as compared to public blockchain implementations. However, the disclosed embodiments can also be applied in numerous other distributed ledger contexts using either private or public blockchains.

Illustrative embodiments can be adapted for enhancing the security of any type of distributed ledger comprising blocks that capture one or more transactions. For example, a wide variety of different transactional logs may be protected through the use of distributed ledger maintained by multiple nodes as disclosed herein. Such arrangements are resilient against compromise of a subset of the multiple nodes.

Moreover, illustrative embodiments are configured to ensure that forks will not be created in the distributed ledger. The distributed ledger is immutable, assuming that the specified quorum of the ledger maintenance nodes are honest.

It is to be appreciated that the foregoing advantages are illustrative of advantages provided in certain embodiments, and need not be present in other embodiments.

The information processing systems disclosed herein are illustratively implemented using one or more processing platforms, examples of which will be now be described in greater detail. A given such processing platform comprises at least one processing device comprising a processor coupled to a memory.

In some embodiments, portions of an information processing system as disclosed herein illustratively comprise cloud infrastructure. The cloud infrastructure in some embodiments comprises a plurality of containers implemented using container host devices. More particularly, the cloud infrastructure in one or more illustrative embodiments comprises container-based virtualization infrastructure configured to implement Docker containers or other types of Linux containers (LXCs).

The cloud infrastructure may additionally or alternatively comprise other types of virtualization infrastructure such as virtual machines implemented using a hypervisor. An example of a commercially available hypervisor platform that may be used to implement portions of the information processing system 100 in an illustrative embodiment is the VMware® vSphere® which may have an associated virtual infrastructure management system such as the VMware® vCenter™. The underlying physical machines may comprise one or more distributed processing platforms that include one or more storage systems.

The cloud infrastructure mentioned above may represent at least a portion of one processing platform. Another example of such a processing platform is a plurality of processing devices which communicate with one another over a network. The network may comprise any type of network, including, by way of example, a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an ASIC, an FPGA or other type of processing circuitry, as well as portions or combinations of such circuitry elements. The memory may comprise RAM, ROM or other types of memory, in any combination. The memory and other memories disclosed herein should be viewed as illustrative examples of what are more generally referred to as "processor-readable storage media" storing executable program code of one or more software programs.

As indicated above, articles of manufacture and other computer program products comprising such processor-readable storage media are considered embodiments of the present invention.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

The particular processing platforms described above are presented by way of example only, and a given information processing system such as system 100 may include additional or alternative processing platforms, as well as numerous distinct processing platforms in any combination, with each such platform comprising one or more computers, servers, storage devices or other processing devices.

Processing devices and other information processing system components can communicate with one another using a variety of different communication protocols and associated communication media.

As indicated previously, components of an information processing system as disclosed herein can be implemented at least in part in the form of one or more software programs stored in memory and executed by a processor of a processing device.

It should again be emphasized that the above-described embodiments of the invention are presented for purposes of illustration only. Many variations and other alternative embodiments may be used. For example, the disclosed techniques are applicable to a wide variety of other types of information processing systems and associated processing devices. Also, the particular features of the illustrative embodiments of FIGS. 1 through 4 can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
at least one processing device comprising a processor coupled to a memory;
wherein the processing device is configured to implement a first ledger maintenance node;
the first ledger maintenance node being configured:
to communicate over one or more networks with a plurality of additional ledger maintenance nodes;
to identify a block for proposed addition to a distributed ledger collectively maintained by the first and additional ledger maintenance nodes;
to apply a digital signature of the first ledger maintenance node to the block;
to receive digital signatures on the block from at least a subset of the additional ledger maintenance nodes; and
responsive to receipt of sufficient digital signatures from respective ones of the additional ledger maintenance nodes to meet a specified quorum of digital signatures required for addition of the block to the distributed ledger, adding the block to the distributed ledger;
wherein the first ledger maintenance node is designated as a leader of the ledger maintenance nodes based at least in part on a leader election carried out by the first and additional ledger maintenance nodes and further wherein only a ledger maintenance node that holds the leader designation is permitted to propose blocks for addition to the distributed ledger, the leader election being repeated responsive to a failure of the first ledger maintenance node to achieve the specified quorum of digital signatures for the proposed block.

2. The apparatus of claim 1 wherein identifying the block for proposed addition to the distributed ledger comprises one of:
generating the block for proposed addition in the first ledger maintenance node; and
identifying the block for proposed addition from one or more blocks proposed for addition by respective ones of the additional ledger maintenance nodes.

3. The apparatus of claim 2 wherein generating the block for proposed addition in the first ledger maintenance node comprises:
accumulating a set of one or more transactions in the first ledger maintenance node; and
generating the block based at least in part on the accumulated set.

4. The apparatus of claim 3 wherein generating the block comprises timestamping the block prior to applying the digital signature of the first ledger maintenance node to the block.

5. The apparatus of claim 1 wherein identifying the block for proposed addition to the distributed ledger comprises abandoning a previously-proposed block generated in the first ledger maintenance node in favor of another block proposed for addition by one of the additional ledger maintenance nodes.

6. The apparatus of claim 1 wherein the distributed ledger is collectively maintained by the first and additional ledger maintenance nodes on a peer-to-peer basis without utilizing a centralized authority and wherein each of the first and additional ledger maintenance nodes adds the same proposed block to the distributed ledger in each of a plurality of rounds of a consensus protocol that requires the specified quorum of digital signatures for addition of the block to the distributed ledger.

7. The apparatus of claim 1 wherein applying a digital signature of the first ledger maintenance node to the block comprises signing the block using a private key of a public-private key pair of the first ledger maintenance node.

8. The apparatus of claim 1 wherein digital signatures from respective ones of the additional ledger maintenance nodes are generated using respective private keys of public-private key pairs of those additional ledger maintenance nodes.

9. The apparatus of claim 1 wherein there are N ledger maintenance nodes and the specified quorum of digital signatures requires digital signatures of at least K of the N ledger maintenance nodes including the first ledger maintenance node, where K<N.

10. The apparatus of claim 9 wherein K>N/2.

11. The apparatus of claim 1 wherein the distributed ledger is periodically truncated by deleting one or more blocks from the distributed ledger that were added to the distributed ledger prior to a designated point in time.

12. The apparatus of claim 1 wherein an integrity proof for a given block of the distributed ledger is generated by:
verifying that a quorum of digital signatures exists for the given block; and
verifying that each of the digital signatures in the quorum is correct.

13. The apparatus of claim 1 wherein an integrity proof for a given block of the distributed ledger is generated by:

checking that correct hashes based at least in part on the given block are included in respective ones of a plurality of subsequent blocks; and
verifying that a quorum of digital signatures exists for a final one of the subsequent blocks.

14. The apparatus of claim 1 wherein responsive to a block proposed by the first ledger maintenance node receiving the specified quorum of digital signatures and at least one other block proposed by another one of the ledger maintenance nodes also receiving the specified quorum of digital signatures, executing a tie-breaking algorithm to select a particular one of the proposed blocks to add to the distributed ledger.

15. The apparatus of claim 14 wherein the tie-breaking algorithm comprises:
generating hashes of respective ones of the proposed blocks; and
selecting a particular one of the proposed blocks to add to the distributed ledger based at least in part on the hashes.

16. A method comprising:
configuring a first ledger maintenance node to communicate over one or more networks with a plurality of additional ledger maintenance nodes;
identifying a block for proposed addition to a distributed ledger collectively maintained by the first and additional ledger maintenance nodes;
applying a digital signature of the first ledger maintenance node to the block;
receiving digital signatures on the block from at least a subset of the additional ledger maintenance nodes; and
responsive to receipt of sufficient digital signatures from respective ones of the additional ledger maintenance nodes to meet a specified quorum of digital signatures required for addition of the block to the distributed ledger, adding the block to the distributed ledger;
wherein the first ledger maintenance node is designated as a leader of the ledger maintenance nodes based at least in part on a leader election carried out by the first and additional ledger maintenance nodes and further wherein only a ledger maintenance node that holds the leader designation is permitted to propose blocks for addition to the distributed ledger, the leader election being repeated responsive to a failure of the first ledger maintenance node to achieve the specified quorum of digital signatures for the proposed block;
the method being performed by at least one processing device comprising a processor coupled to a memory.

17. The method of claim 16 wherein responsive to a block proposed by the first ledger maintenance node receiving the specified quorum of digital signatures and at least one other block proposed by another one of the ledger maintenance nodes also receiving the specified quorum of digital signatures, executing a tie-breaking algorithm to select a particular one of the proposed blocks to add to the distributed ledger.

18. A computer program product comprising a non-transitory processor-readable storage medium having stored therein program code of one or more software programs, wherein the program code when executed by at least one processing device comprising a processor coupled to a memory causes the processing device:
to configure a first ledger maintenance node to communicate over one or more networks with a plurality of additional ledger maintenance nodes;

to identify a block for proposed addition to a distributed ledger collectively maintained by the first and additional ledger maintenance nodes;

to apply a digital signature of the first ledger maintenance node to the block;

to receive digital signatures on the block from at least a subset of the additional ledger maintenance nodes; and responsive to receipt of sufficient digital signatures from respective ones of the additional ledger maintenance nodes to meet a specified quorum of digital signatures required for addition of the block to the distributed ledger, adding the block to the distributed ledger;

wherein the first ledger maintenance node is designated as a leader of the ledger maintenance nodes based at least in part on a leader election carried out by the first and additional ledger maintenance nodes and further wherein only a ledger maintenance node that holds the leader designation is permitted to propose blocks for addition to the distributed ledger, the leader election being repeated responsive to a failure of the first ledger maintenance node to achieve the specified quorum of digital signatures for the proposed block.

19. The computer program product of claim 18 wherein responsive to a block proposed by the first ledger maintenance node receiving the specified quorum of digital signatures and at least one other block proposed by another one of the ledger maintenance nodes also receiving the specified quorum of digital signatures, executing a tie-breaking algorithm to select a particular one of the proposed blocks to add to the distributed ledger.

20. The computer program product of claim 18 wherein meeting the specified quorum of digital signatures required for addition of the block to the distributed ledger includes verification that each of the received digital signatures in the quorum is a correct digital signature of its corresponding one of the additional ledger maintenance nodes.

\* \* \* \* \*